United States Patent
Beck et al.

(10) Patent No.: US 6,890,586 B2
(45) Date of Patent: May 10, 2005

(54) SYSTEM AND METHOD OF MAKING AN IN-MOLD CLEAR-COATED COMPOSITE

(75) Inventors: Charles Beck, Newburyport, MA (US); Michael Jewett, Merrimac, MA (US)

(73) Assignee: G.I. Plastek Limited Partnership, Westlake, OH (US)

( * ) Notice: Subject to any disclaimer, the term of this patent is extended or adjusted under 35 U.S.C. 154(b) by 0 days.

(21) Appl. No.: 09/934,263

(22) Filed: Aug. 21, 2001

(65) Prior Publication Data

US 2003/0039840 A1 Feb. 27, 2003

(51) Int. Cl.$^7$ ................................................ B05D 1/02
(52) U.S. Cl. .................. 427/133; 427/135; 427/402; 427/427.4; 427/314; 427/372.2
(58) Field of Search .................. 427/133, 135, 427/402, 427.4, 314, 372.2, 487, 236, 333, 384, 385.5, 393.5; 428/423.1, 423.3; 528/48; 264/478, 35

(56) References Cited

U.S. PATENT DOCUMENTS

| | | | | |
|---|---|---|---|---|
| 4,283,462 A | | 8/1981 | Meyer et al. | 428/506 |
| 4,349,643 A | * | 9/1982 | Mohiuddin | 524/560 |
| 4,501,790 A | * | 2/1985 | Aizawa et al. | 428/301.1 |
| 4,535,142 A | * | 8/1985 | Brauer et al. | 528/75 |
| 4,550,060 A | * | 10/1985 | Makhlouf et al. | 428/423.1 |
| 5,000,902 A | | 3/1991 | Adams | 264/510 |
| 5,000,903 A | * | 3/1991 | Matzinger et al. | 264/135 |
| 5,087,405 A | | 2/1992 | Maker | 264/255 |
| 5,662,996 A | | 9/1997 | Jourquin | 428/318.8 |
| 6,365,679 B1 | * | 4/2002 | Crast et al. | 473/351 |

FOREIGN PATENT DOCUMENTS

| | | |
|---|---|---|
| EP | 0594911 A1 | 5/1994 |
| EP | 0995568 A1 | 4/2000 |
| GB | 2300589 A | 11/1996 |
| WO | WO94/07674 | 4/1994 |
| WO | WO99/61216 | 12/1999 |

OTHER PUBLICATIONS

International Search Report for PCT/US02/14186.
International Search Report for PCT/US02/14112.

* cited by examiner

*Primary Examiner*—James J. Seidleck
*Assistant Examiner*—Melanie Bissett
(74) *Attorney, Agent, or Firm*—Bromberg & Sunstein LLP

(57) ABSTRACT

A plastic product covered with a clear coating which is applied through an in-mold coating process. Covalent bonds hold the clear coating and the plastic substrate together, and the clear coating is capable of resisting delamination and of inhibiting fading of a pigmented surface underlying the clear coating. A preferred in-mold coating method of preparing a plastic part with a clear-coat surface includes the steps of (a) providing a mold, (b) heating the mold, (c) providing an unpigmented first-reactant/solvent mixture, (d) providing an unpigmented second-reactant/solvent mixture, (e) mixing the first-reactant/solvent mixture and the second-reactant/solvent mixture to form a clear-coat mixture, (f) spraying the clear-coat mixture onto the heated mold surface, (g) providing a pigmented third-reactant/solvent mixture, (h) providing a fourth-reactant/solvent mixture, (i) mixing the third-reactant/solvent mixture and the fourth-reactant/solvent mixture to form a pigmented mixture, (j) spraying the pigmented mixture, during the open time of the clear-coat mixture, onto the clear-coat mixture previously sprayed onto the heated mold surface, (k) applying, over the sprayed pigmented mixture, a substrate-forming material, so as to create an uncured preform, and (l) allowing the preform to cure so as to form a substrate having a clear-coat surface.

7 Claims, 2 Drawing Sheets

SYSTEM AND METHOD OF MAKING AN IN-MOLD CLEAR-COATED COMPOSITE

TECHNICAL FIELD

The invention relates to plastic products covered by a clear coating through a process of in-mold coating.

BACKGROUND ART

The process of forming a coating in a mold was developed to reduce the cost of producing an attractive surface finish on reaction-injection-molded (RIM) parts. The process uses compatible urethane chemistry for the coating and substrate to form the decorative and protective surface layer "coating" simultaneously with the structural substrate layer. In-mold coatings exhibit cross-linked bonding to the RIM substrate and they can be custom formulated to match physical properties with a wide range of polyurethane substrates, including structural foams and elastomers. The in-mold coating process with its unique approach to integrating flexible coatings with rugged polyurethane substrates is a natural fit for manufacturing components used is market segments such as heavy trucks, agriculture and construction, boating, and lawn-and-garden. FIG. 1 shows a sectional view of a prior-art in-mold coated surface, in which the pigmented coating 10 is covalently bonded to the polyurethane substrate 14. (As the coating 10 preferably is between about 1.5 and 2 thousandths of an inch in thickness (dry film thickness) whereas the substrate 14 can be up to an inch or more in thickness, FIG. 1 is of course not drawn to scale.)

As a result of the conventional process of in-mold coating, the substrate is covered by a layer of pigmented coating, as shown in FIG. 1. In this process, the components that form the pigmented coating 10 are first sprayed onto the mold surface, while the mold is open, so as to form a thin layer. Then the material that forms the substrate is applied onto the pigmented layer. Typically, the substrate-forming material is applied by injecting it into the mold while the mold is closed. In order to be able to properly mix and spray the coating components to create a coating with a satisfactory finish, solvents are included by the coating formulator. The solvents provide a sprayable viscosity to the coating components, so that a uniform thin layer can be sprayed onto the mold. In contrast, the substrate-forming material should be solventless. In-mold coating can yield numerous benefits including a high gloss "Class A" finish without "orange peel," runs, or dirt. Significantly, such attributes can generally be achieved with tremendous savings of time and material compared to conventional spray painting methods. Physical property and chemical resistance tests have shown that in-mold coated surfaces perform in some respects as well as or better than post-mold painted surfaces. The process of in-mold coating eliminates the need for post-mold painting steps such as cleaning, degreasing, sanding, and priming. Those procedures can constitute up to half of a RIM product's total cost.

In-mold coatings differ substantially from conventional coatings that are applied after molding in which a layer of paint is sprayed on after the substrate is cured. Coatings applied after curing do not have the same opportunity to chemically bond to the substrate compared to coatings applied in the mold. Because in-mold coatings are formed simultaneously with the substrate, they are a chemically bonded, integral part of the composite. Consequently, in-mold coatings do not crack or peel as readily as post-mold painted coatings. Furthermore, a phenomenon termed "outgassing" occurs with RIM parts where gaseous processing and reaction byproducts escape from the freshly molded part. Outgassing can interfere with the drying/curing of coatings applied after molding, causing voids that ruin the finish. Steps to avoid outgassing interference such as waiting (storage) or post curing to accelerate the de-gassing add significant cost to the finishing process. Coatings produced with the in-mold coating process are unaffected by RIM substrate outgassing; the high quality finish is formed simultaneously with the substrate essentially before outgassing occurs.

Even though the pigments and resins may be the same in coatings formed by the in-mold process and coatings formed by the conventional post-mold spray application process, it has been reported that in-mold coatings sometimes fade more readily when exposed to direct sunlight. It is speculated in these cases that the reason for the difference lies in the physics of the application method used. For post-mold spray applied coatings, pigments can settle as the paint dries over a period of time, creating a stratified layer that is resin rich near the surface and pigment rich at a depth removed from the surface. The resin rich region near the surface can absorb UV radiation, therefore protecting the underlying pigments. By comparison, coatings formed by the in-mold coating process are more homogeneous, containing pigments more uniformly distributed throughout the coating layer because the liquid coating materials gel very quickly as a result of the hot mold.

SUMMARY OF THE INVENTION

We have provided, in embodiments of our invention, a plastic product covered with a clear coating which is applied through an in-mold coating process. In plastic products made according to our invention, covalent bonds hold the clear coating and the plastic substrate together; and the clear coating is capable of resisting delamination and/or degradation caused by sunlight, heat, acid rain, and other weather-related factors. The clear coating is capable of inhibiting fading of a pigmented surface underlying the clear coating.

In a preferred embodiment, the plastic product includes a plastic substrate, a pigmented coating over the plastic substrate, and a clear coating over the pigmented coating, wherein the clear coating and the pigmented coating are applied through the in-mold-coating process. In lieu of the pigmented coating, the substrate itself may be pigmented. Preferably, the plastic substrate is made of aromatic polyurethane, while the clear coating and the pigmented coating are made of aliphatic polyurethane. In a preferred embodiment, the clear coating has a thickness of between 0.0001 inches and 0.025 inches, and in a further preferred embodiment the clear coating has a thickness of between 0.0005 inches and 0.005 inches.

A preferred composition for making the clear coating in an in-mold coating process includes a first unpigmented mixture, including a polyol and a first solvent, and a second unpigmented mixture, including an aliphatic polyisocyanate and a second solvent, wherein the first mixture and the second mixture are mixed together at a volume ratio of between 1.5:1 and 3:1. (A solvent includes a single solvent or a mixture of solvents. In preferred embodiments, a mixture of solvents is used to adjust solubility and evaporation rate of the mixture.) In addition to including this composition, a kit for in-mold clear coating of a substrate may further include a third pigmented mixture including a polyol and a third solvent, and a fourth mixture, including an aliphatic polyisocyanate and a fourth solvent, wherein the third mixture and the fourth mixture are mixed at a volume ratio of between 1.5:1 and 3:1 to form a pigmented coat. The solvents may be selected from the group consisting of ketones, acetates and xylene, and the solvents may all be the same or may differ from each other.

A preferred in-mold coating method of preparing a plastic part with a clear-coat surface includes the steps of (a) providing a mold having a mold surface having a predetermined degree of finish, the degree of finish such that a mating surface of cured polymer-based material fabricated in the mold would exhibit a "Class A" quality, (b) heating the mold to a temperature between approximately 40 degrees Celsius and approximately 95 degrees Celsius, (c) providing an unpigmented first-reactant/solvent mixture, (d) providing an unpigmented second-reactant/solvent mixture, (e) mixing the first-reactant/solvent mixture and the second-reactant/solvent mixture to form a clear-coat mixture, (f) spraying the clear-coat mixture onto the heated mold surface, (g) providing a pigmented third-reactant/solvent mixture, (h) providing a fourth-reactant/solvent mixture, (i) mixing the third-reactant/solvent mixture and the fourth-reactant/solvent mixture to form a pigmented mixture, (j) spraying the pigmented mixture, during the open time of the clear-coat mixture, onto the clear-coat mixture previously sprayed onto the heated mold surface, (k) applying, over the sprayed pigmented mixture, a substrate-forming material, so as to create an uncured preform, and (l) allowing the preform to cure so as to form a substrate having a clear-coat surface. An alternative process skips the steps (g) through (j) and applies the substrate-forming material (which may be pigmented) directly onto the sprayed clear-coat layer.

The mold is held open during steps (f) through (j) of this process to permit spraying onto the mold surface and then may be closed prior to step (k) when the substrate-forming material may then be injected into the closed mold. Alternatively, while the mold is still open, a barrier formulation may be applied on the sprayed pigmented mixture so as to create an unreinforced barrier layer, and then a polymeric-matrix-forming material and reinforcing components (such as fibers) are applied over the barrier layer; these layers are then allowed to cure so as to form a composite with a reinforced substrate and a clear-coat covering a pigmented surface.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

Figure 1:
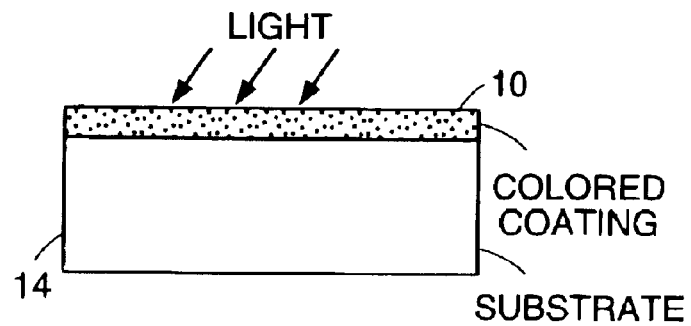
FIG. 1 is a sectional view (not to scale) of a prior-art in-mold coated surface.
Figure 2:
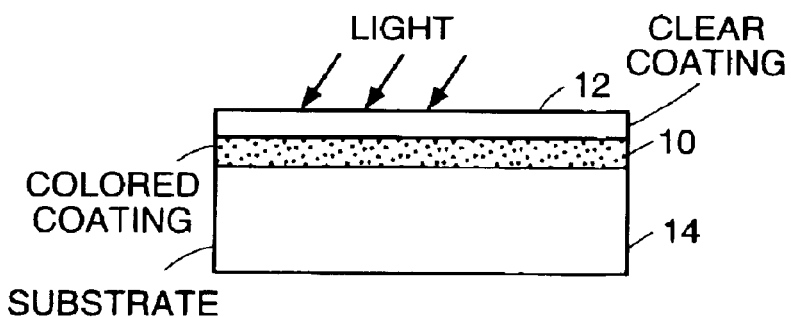
FIG. 2 is a sectional view (not to scale) of an in-mold clear-coated surface according to a preferred embodiment of the invention.

Adding a clear (i.e., unpigmented) coating over the colored "pigmented" in-mold coating significantly slows the fading of color and gloss that can result from exposure to sunlight. Since pigments in the in-mold coatings 10 of the prior art are present at the surface, as shown in FIG. 1, the pigments are subject to being broken down relatively quickly by ultraviolet light from the sun. A clear coating 12 added over a pigmented coating 10 acts like sunscreen by blocking a significant portion of ultraviolet light from reaching the underlying pigments. (It should be understood that the term "clear coating" refers to a coating that is substantially transparent to visible light but which may reflect, absorb, or otherwise protect the underlying pigments from ultraviolet light.)

However, simply spraying a clear coating 12 over an in-mold coated surface by post-mold spray methods typically requires that the piece first be de-gassed—which, as noted above, is an expensive, time-consuming process. Otherwise, the escaping gasses can ruin the finish. For this reason, and in order to keep the cost low, it is desirable that the clear coating be achieved through a process of in-mold coating.

Figure 4:
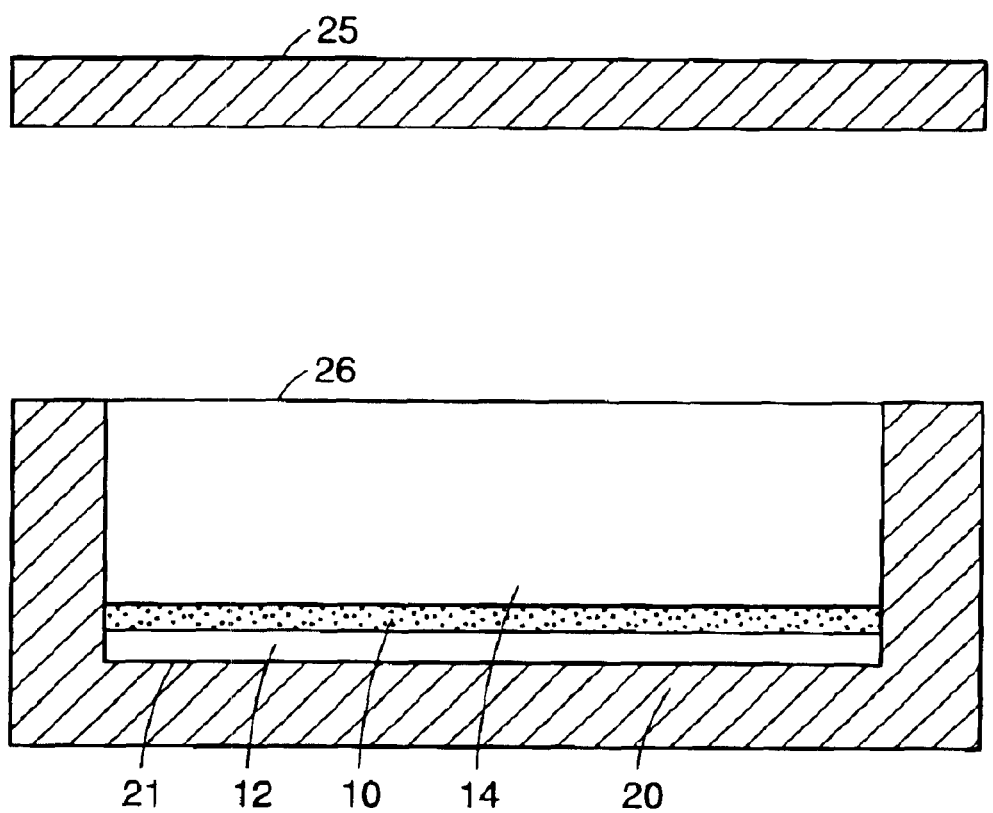
FIG. 4 is a sectional view (not to scale) of a mold forming an in-mold clear-coated surface.

In a preferred embodiment of the present invention, a clear coating and then a pigmented coating are applied to a surface of the mold before the substrate-forming material is applied, usually injected, into the mold. As illustrated in FIG. 4, the clear coating 12 is first applied to the mold 20, then the pigmented coating 10 is applied onto the clear coating 12, and the substrate-forming material 14 is then applied over the pigmented coating 10. (Although FIG. 4 shows a mold 20 with a fairly flat surface 21, it will be understood that the mold may include contours as a typical RIM mold may.)

The clear coating 12 may be formulated from aliphatic polyurethane. When compared with aromatic polyurethane, aliphatic polyurethane better maintains its new appearance after exposure to the elements. As noted above, the clear coating acts like sunblock to dramatically slow fading. The clear coating may be applied to result in a thickness of between about 0.5 mils to about 2 mils. (1 mil=0.001 inch.) The surface 21 of the mold 20 onto which the clear coating 12 is applied preferably has a degree of finish such that a mating surface of cured polymer-based material fabricated in the mold would exhibit a "Class A" quality. When polyurethane or other thermosetting materials are cured, the created surface on the molded part will tend to match the smoothness and other characteristics of the mating mold surface 21, so the mold surface 21 is prepared to exhibit minimal surface roughness when a composite surface is desired to exhibit high gloss. Mold surface 21 may be polished or otherwise smoothed to facilitate creation of a particular type of "Class A" composite surface 21. Highly polished nickel or chrome mold surfaces are generally achieved by diamond polishing. Alternatively, the mold surface may be prepared to facilitate creation of another type of "Class A" composite surface having a low-gloss or even a mildly textured surface. An example of the latter surface is a subtle, leather-grain appearance that may be created by texturing the mold rather than by polishing it to a high luster.

For polyurethane-based systems, mold 20 may be heated to a temperature of between approximately 40 degrees Celsius and approximately 95 degrees Celsius in order to promote curing. Note that although mold 20 is preferably heated, the fabrication methods disclosed should work at room temperature. (In addition to being an economic factor, the speed of reaction is usually an influence on cosmetic quality, and faster reactions generally are preferred when the objective is to obtain a glossy, smooth "Class A" finish.) Processing temperatures of reactants and mold 20 are chosen to provide a desired speed of composite processing. Substrate 14, if polyurethane-based, may be made up of foaming or non-foaming polyurethane.

To form the clear coating, two components are mixed: an unpigmented polyol/solvent component and an isocyanate/solvent component. (The polyol and the isocyanate are the two reactants that bind to form the resin that makes up the clear coating.) It has been found that mixing these two components at a volume ratio of about 2:1 (i.e., 2 parts unpigmented polyol/solvent component to 1 part isocyanate/solvent component, thereby creating a mixture consisting of about 30% to 60% solids) provides superior results. In particular, this formulation has been found to increase the open time of the mixture sprayed onto the mold. Increasing the open time allows a greater amount of time to pass before a second layer—which in this case will be the pigmented coating—may be sprayed onto the clear coating without jeopardizing the finish. With the clear coating 12 being applied to a mold surface 21 heated to over 40 degrees Celsius, the open time is measured in seconds; therefore, even with the longer open time, it is important that the second layer be applied as quickly as possible after the clear layer is applied. In addition, the high solids level has been found to allow the coatings to be applied at greater thickness—3–4 mils DFT (DFT=dry film thickness) instead of the prior art 1.5–2 mils DFT with coatings having a lower solids content—without jeopardizing the finish. Therefore, two layers may be separately applied without requiring each layer to be less than 1 mil DFT.

After spraying the clear coating 12 onto the heated mold surface 21 and during the open time of the clear coating, the pigmented coating 10 is sprayed over the clear coating. Like the clear coating, two components are mixed to form the pigmented coating: in this case, a pigmented polyol/solvent component and an isocyanate/solvent component. Since the pigmented coating must be compatible to the clear coating, the two components of the pigmented coating in a preferred embodiment should also be mixed at a volume ratio of about 2:1 (thereby creating a mixture consisting of about 30% to 60% solids).

In one embodiment of the invention, the closure 25 of the mold 20 is first closed, and then a substrate-forming material 14 is injected into the mold cavity, so as to create an uncured preform. Preferably, a reaction injection molding (RIM) process is used. The preform is then allowed to cure so as to form a substrate having a clear-coat surface.

Alternatively—in the manner disclosed in copending provisional application No. 60/289,610 filed by Beck and Donohue on May 8, 2001 for a "System and Method of Making a Layered, Reinforced Composite," which application in its entirety is incorporated herein by reference—a barrier layer (item 16 of FIG. 3) may be applied over the pigmented coating before the application of the bulk of a substrate-forming material (item 15 of FIG. 3) containing reinforcing components, such as reinforcing fibers. Alternatively, other forms of reinforcing components such as spherical or platelet reinforcing particles may be used in lieu of the fibers. Both the barrier layer 16 and the reinforced substrate-forming material 15 are applied while the mold's closure is opened. After these two layers are applied, the closure may be closed to promote curing of the substrate, to compress the pre-form materials prior to curing, and to form further geometric features.

Referring again to FIG. 4, the closure 25 allows the application of pressure to assist in curing composite 14, although in alternative embodiments of the invention the pre-form may be cured without a closure. Nevertheless, the incorporation of additional structural elements or molded features (not shown) on or near a back surface 26 would best be accomplished using a mating closure 25. These features may include but are not limited to ribs, bosses, or other strengtheners. One of skill in the art will understand that mold 20 need not be filled before closure 25 is placed in the case of foaming polyurethane. In this instance, it is desirable for closure 25 to be in place first with foaming to occur subsequently.

Figure 3:
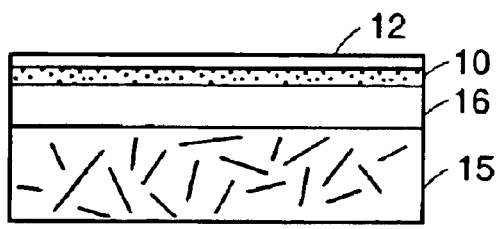
FIG. 3 is a sectional view (not to scale) of an in-mold clear-coated surface according to an alternative preferred embodiment of the invention, wherein the substrate includes a fiber-reinforced layer and a barrier layer.

By using a RIM process with compatible polyurethane coatings 10, 12, the coatings become covalently bonded to each other and to the substrate 14. In this manner, the combination of in-mold coating techniques (formation of polyurethane coatings from diisocyanate plus polyols, for example) to create clear coat 12 and pigmented coat 10 with RIM molding processes to create substrate layer 14 has been used to successfully create structures with durable "Class A" finishes in an economic, reproducible fashion. The layers 12, 10, and 14 (or 12, 10, 16 and 15, as shown in FIG. 3) covalently bond to one another upon cure and do not delaminate in service.

The highly reactive polyurethane forming materials used to create clear coat 12 and pigmented coat 10 tend to gel in place within seconds of being sprayed onto the heated mold 20. Gel is a general term related to the extent of reaction of these forming materials. It is used to describe a noticeable occurrence of a transformation of the forming materials from a flowing, liquid-like state to a viscous, elastic-like state. It will be understood by those skilled in the art that gel of a first layer is requisite prior to application of subsequent layers. By the time the pigmented layer is sprayed on the clear layer, the clear layer has gelled so that there is no diffusion. Thus, there is a distinct boundary between the clear coat and the pigmented coat, although the two coats are bound together through the interactions of covalent bonds. When such a fabrication approach is followed, subsequent application of substrate layer 14 will not disturb previously formed layers to an extent that would be a detriment to the realization of the as-cured "Class A" surface of the composite.

The material used to create clear coating 12 may be a solvent-based, two-component precursor of aliphatic polyurethane. See the Example below for a specific, suitable unpigmented formulation. Experiments have been performed with material containing between about 30% and about 60% volume fraction of solids (although it is expected that other formulations can be used as well). This material has a so-called "working time" once the two components are mixed between approximately 20 and approximately 50 minutes. The solvents evaporate rapidly when this clear coat forming mixture is spray applied to the heated mold 20; the remaining reactants then gel "in place" in the mold 20 within seconds. Gelling typically occurs within about 30 to about 120 seconds. The materials used to form pigmented coat 10 gel within approximately 30 seconds of being applied atop clear coat 12 onto heated mold 20. A slower reacting system for forming pigmented coat 10 or use of a lower mold temperature would result in an extended gel time. Such variation in conditions would still work as intended to create a clear-coated composite if gelling is allowed to occur prior to application of the substrate-forming material 14.

The materials used to make substrate layer 14 may gel in a time period of between 1 and 120 seconds for non-foaming systems. Alternatively, foaming systems may be used, where the foaming action or "creaming" is required prior to gel. In this case, "cream time" is typically between 18 and 120 seconds while the subsequent gel time is between 50 and 150 seconds.

In the above description, a clear coating is utilized to cover and protect a pigmented coating, which in turn covers the substrate. Alternatively, the clear coating can be used to cover and protect the substrate directly. This application of the clear coating bonded directly to the substrate is especially useful when the substrate itself already has the desired color, since the substrate itself still needs to be protected from sunlight in order to inhibit fading, and since the glossy finish provided by the clear coating improves the appearance of the piece. To form such a clear-coated substrate, the above-described procedure may be followed with the exception of the steps of mixing and applying the pigmented coating. This clear-coating-only technique may be used with a pigmented barrier and a layer containing reinforcing components (formed in the manner disclosed in U.S. patent application Ser. No. 60/281,610, discussed hereinabove).

This clear-coating-only technique also may be used as a molding diagnostic tool. By forming a clear coating directly on the substrate, it is possible in some cases to reveal color striations, or flow lines in the substrate which provide evidence of flow patterns. Using the clear-coating-only technique can help to highlight otherwise subtle features of the substrate at the substrate-coating interface that may indicate aspects of the molding process. Accordingly, applying a clear coating only on a prototype mold or applying a prototype substrate material directly onto the clear coating in this manner improves the ability to analyze the prototype molding process and improve same.

EXAMPLE

The High Solids Composition for In-Mold Clear Coating

In both the clear coating and the pigmented coating in this example, the chemical reaction is as the following:

Aliphatic Triisocyanate+Polyols→Cured Polyurethane Coating on Polyurethane Substrate In the two-component polyurethane coating material, the polyol component comprises:
 polyol (reactant)
 solvents (carriers, non-reactant)
 pigments (in pigmented coating, but not in clear coating)
 IMR(s) (Internal Mold Release(s))
 flow modifiers
 UV absorbers
 catalyst (usually a tin compound).
The isocyanate component comprises:
 isocyanate pre-polymer (reactant)
 solvents (carriers, non-reactant)

The solvents in both components are utilized to lower viscosity, increase mixing, and allow sufficient atomization for spraying. The isocyanate and polyol components may have some solvents in common, though this is not a requirement.

In conventional procedures of in-mold coating, a 5.5:1 formulation is used, i.e., 5.5 volume parts of polyol component to 1 volume part of isocyanate component. This 5.5:1 formulation represents a lower solids liquid sprayable material. In the procedure for in-mold clear coating, the volume of solvents in the polyol component is reduced to a level in relation to the volume of solvents in the isocyanate component, so that the volume ratio of polyol mixture and isocyanate mixture is approximately 2:1. This 2:1 formulation produces a high solids liquid sprayable coating material.

Both the clear coating and the pigmented coating are preferably of the 2:1 formulation. From the 5.5:1 formulation to 2:1 formulation, the solids level of the coating forming mixture increases from about 30% solids to 50–60% solids.

In addition to the 2:1 formulation, the procedure for in-mold clear coating adopts other variations, such as the internal mold release used, catalyst level and solvents with slower evaporation rates.

With these variations, the new procedure will create a longer open time to spray the coatings, and produce the two layer coating at thickness of 3–4 mils (DFT). That is, 1.5–2 mils per coating layer, and 3–4 mils total for both the clear coating and pigmented coating combined. With these variations, applying the solvent-containing coatings at such a thickness i.e., less than 4 mils, would not cause pop or porosity within the coatings themselves.

Therefore, these formulations may be utilized to produce the in-mold clear coating.

Weathering Studies

The surface appearance is evaluated in terms of gloss (i.e., intensity of reflected light as a consequence of light scattering), DOI (Distinctness Of Image), and color, and how these attributes are affected by weathering. Weathering includes exposure to the elements such as sunlight, heat, acid rain, and other weather-related factors. The weathering studies determine the performance of the surface over the equivalent of one and three years of exposure.

The studies considered several types of surface: (i) surfaces made with current in-mold coating (IMC) technique with conventional single-stage pigmented layer with low solids (5.5:1); (ii) surfaces made with two-stage IMC (i.e., the present invention), with high solids (2:1); (iii) surfaces with post-mold spray applied coating; and (iv) surfaces with a clear coating applied post-mold over a single-stage IMC pigmented layer.

These studies found the present invention provided a noticeable improvement to the initial surface appearance compared to the current single-stage IMC technique. Furthermore, the present invention greatly inhibits fading of the surface, with color, gloss, and DOI retention equivalent or better than post-mold applied coatings.

Therefore, the new procedure of in-mold coating described herein solves the problems of the prior art procedures by blocking out ultraviolet light and slowing the fading of the pigmented coating. Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. An in-mold coating method of preparing a plastic part with a clear-coat surface, the method comprising:
 providing a mold having a mold surface having a predetermined degree of finish;
 heating the mold to a temperature between approximately 40 degrees Celsius and approximately 95 degrees Celsius;
 providing an unpigmented first-reactant/solvent mixture;
 providing an unpigmented second-reactant/solvent mixture;
 mixing the unpigmented first-reactant/solvent mixture and the unpigmented second-reactant/solvent mixture to form a clear-coat mixture;

spraying the clear-coat mixture onto the heated mold surface, the clear-coat mixture having an open time on the heated mold surface;

providing a pigmented third-reactant/solvent mixture;

providing a fourth-reactant/solvent mixture;

mixing the pigmented third-reactant/solvent mixture and the fourth-reactant/solvent mixture to form a pigmented mixture;

spraying the pigmented mixture, during the open time of the clear-coat mixture, onto the clear-coat mixture previously sprayed onto the heated mold surface;

applying, over the sprayed pigmented mixture, a substrate-forming material, so as to create an uncured preform; and allowing the preform to cure so as to form a substrate having a clear-coat surface with substantially the pre-determined degree of finish;

wherein the clear-coat mixture and the pigmented mixture are sprayed in an amount to form a total coating layer thickness substantially between 3.0 to 4.0 mils DFT.

2. An in-mold coating method of preparing a plastic part with a clear-coat surface, the method comprising:

providing a mold having a mold surface having minimal surface roughness;

heating the mold to a temperature between approximately 40 degrees Celsius and approximately 95 degrees Celsius;

providing an unpigmented first-reactant/solvent mixture;

providing an unpigmented second-reactant/solvent mixture;

mixing the unpigmented first-reactant/solvent mixture and the unpigmented second-reactant/solvent mixture to form a clear-coat mixture;

spraying the clear-coat mixture onto the heated mold surface, the clear-coat mixture having an open time on the heated mold surface;

providing a pigmented third-reactant/solvent mixture;

providing a fourth-reactant/solvent mixture;

mixing the pigmented third-reactant/solvent mixture and the fourth-reactant/solvent mixture to form a pigmented mixture;

spraying the pigmented mixture, during the open time of the clear-coat mixture, onto the clear-coat mixture previously sprayed onto the heated mold surface;

applying, over the sprayed pigmented mixture, a substrate-forming material, so as to create an uncured preform; and wherein the clear-coat mixture and the pigmented mixture are sprayed in an amount to form a total coating layer thickness substantially between 3.0 to 4.0 DFT.

3. The method according to claim 2, wherein the mold may be opened to permit spraying onto the mold surface; wherein the mold is closed after the pigmented mixture is sprayed onto the clear-coat mixture; and wherein the substrate-forming material is injected into the closed mold.

4. The method according to claim 2, wherein a barrier formulation is applied on the sprayed pigmented mixture so as to create an unreinforced barrier layer; wherein the substrate-forming material includes a polymeric-matrix-forming material and reinforcing components and is applied over the barrier layer; and wherein the preform is cured so as to form a composite with a reinforced substrate and a clear-coat pigmented surface.

5. The method according to claim 4, wherein the reinforcing components include fibers.

6. The method according to claim 2, wherein the unpigmented first-reactant/solvent mixture and the pigmented third-reactant/solvent mixture include polyol as a reactant, and wherein the second-reactant/solvent mixture and the fourth-reactant/solvent mixture include isocyanate as a reactant.

7. The method according to claim 6, further comprising:

(a) mixing the unpigmented first-reactant/solvent mixture and the unpigmented second-reactant solvent mixture to form the clear-coat mixture having a total volume fraction of solids substantially between 0.30 and 0.60; and (b) mixing the pigmented third-reactant/solvent mixture and the fourth-reactant solvent mixture to form the pigmented mixture having a total volume fraction of solids substantially between 0.30 and 0.60.

* * * * *

UNITED STATES PATENT AND TRADEMARK OFFICE
CERTIFICATE OF CORRECTION

PATENT NO.    : 6,890,586 B2
DATED         : May 10, 2005
INVENTOR(S)   : Charles Beck et al.

Page 1 of 1

It is certified that error appears in the above-identified patent and that said Letters Patent is hereby corrected as shown below:

<u>Column 10,</u>
Lines 7-9, replace with -- allowing the preform to cure so as to form a substrate having a clear-coat surface, the clear-coat surface having a high gloss finish; wherein the clear-coat mixture and the pigmented mixture are sprayed in an amount to form a total coating layer thickness substantially between 3.0 to 4.0 mils DFT. --

Signed and Sealed this

Nineteenth Day of July, 2005

JON W. DUDAS
*Director of the United States Patent and Trademark Office*